(12) United States Patent
Kajiwara

(10) Patent No.: US 11,691,457 B2
(45) Date of Patent: Jul. 4, 2023

(54) NON-PNEUMATIC TIRE

(71) Applicant: Toyo Tire Corporation, Itami (JP)

(72) Inventor: Kohei Kajiwara, Itami (JP)

(73) Assignee: Toyo Tire Corporation, Itami (JP)

(*) Notice: Subject to any disclaimer, the term of this patent is extended or adjusted under 35 U.S.C. 154(b) by 449 days.

(21) Appl. No.: 16/989,102

(22) Filed: Aug. 10, 2020

(65) Prior Publication Data
US 2021/0061011 A1 Mar. 4, 2021

(30) Foreign Application Priority Data
Aug. 26, 2019 (JP) .................................. 2019-153505

(51) Int. Cl.
| | | |
|---|---|---|
| B60C 7/18 | (2006.01) | |
| B60C 7/10 | (2006.01) | |
| B60C 7/22 | (2006.01) | |
| B60C 7/00 | (2006.01) | |
| B60C 7/14 | (2006.01) | |

(52) U.S. Cl.
CPC .............. B60C 7/22 (2013.01); B60C 7/102 (2013.01); B60C 7/18 (2013.01); B60C 7/146 (2021.08); B60C 2007/005 (2013.01)

(58) Field of Classification Search
CPC .. B60C 7/18; B60C 7/146; B60C 7/22; B60C 7/102; B60C 2007/005
See application file for complete search history.

(56) References Cited

U.S. PATENT DOCUMENTS

| | | | | |
|---|---|---|---|---|
| 2004/0159385 A1* | 8/2004 | Rhyne | ....................... | B60C 7/00 152/197 |
| 2014/0332127 A1* | 11/2014 | Iwamura | .................. | B60B 19/10 152/17 |
| 2016/0089935 A1* | 3/2016 | Iwamura | ................ | B29D 30/02 264/135 |
| 2016/0257170 A1* | 9/2016 | Sugiya | ....................... | C08L 7/00 |
| 2017/0057294 A1* | 3/2017 | Iwamura | .................... | B60C 7/18 |

(Continued)

FOREIGN PATENT DOCUMENTS

| | | |
|---|---|---|
| CN | 107031289 A | 8/2017 |
| CN | 107074015 A | 8/2017 |

(Continued)

OTHER PUBLICATIONS

Office Action dated May 19, 2022, issued in counterpart JP application No. 202010835456.5, with English translation. (21 pages).

(Continued)

*Primary Examiner* — Kip T Kotter
(74) *Attorney, Agent, or Firm* — WHDA, LLP

(57) ABSTRACT

In a non-pneumatic tire, an outer ring comprises a laminate having a plurality of fiber layers, and at least one elastomer layer interposed between an adjacent pair of a plurality of fiber layers, the plurality of fiber layers include an outermost layer which among the plurality of fibers is that which is arranged in outwardmost fashion in a tire radial direction, and an innermost layer which among the plurality of fibers is that which is arranged in inwardmost fashion in the tire radial direction, and at least one of the outermost layer and the innermost layer contains a first fiber array at which fibrous material is arrayed so as to extend in the long direction of a joint.

11 Claims, 7 Drawing Sheets

(56) References Cited

U.S. PATENT DOCUMENTS

| | | | |
|---|---|---|---|
| 2017/0072746 A1* | 3/2017 | Iwamura | B60C 13/001 |
| 2017/0113489 A1 | 4/2017 | Iwamura et al. | |
| 2017/0197467 A1* | 7/2017 | Iwamura | B60C 7/18 |
| 2017/0291453 A1* | 10/2017 | Sugiya | B60C 1/00 |
| 2017/0305192 A1 | 10/2017 | Yokoyama et al. | |
| 2018/0141380 A1 | 5/2018 | Celik | |
| 2019/0070902 A1* | 3/2019 | Kajiwara | B60C 7/18 |
| 2019/0070903 A1* | 3/2019 | Tsuji | B60C 7/14 |
| 2019/0070904 A1* | 3/2019 | Kitamura | B60C 7/14 |
| 2019/0070905 A1* | 3/2019 | Kajiwara | B60C 7/18 |

FOREIGN PATENT DOCUMENTS

| | | |
|---|---|---|
| CN | 108081873 A | 5/2018 |
| EP | 3 196 048 A1 | 7/2017 |
| JP | 2015-39986 A | 3/2015 |
| JP | 2017-185925 A | 10/2017 |
| JP | 2018-165154 A | 10/2018 |
| JP | 2019-43505 A | 3/2019 |
| KR | 2013 0063254 A | 6/2013 |
| WO | 2019/107305 A1 | 6/2019 |

OTHER PUBLICATIONS

Extended Searh Report dated Nov. 11, 2020, issued in counterpart EP Application No. 20190269.9 (28 pages).
Office Action dated Mar. 14, 2023, issued in counterpart JP application No. 2019-153505, with English translation (8 pages).

* cited by examiner

NON-PNEUMATIC TIRE

CROSS REFERENCE TO RELATED APPLICATIONS

This application claims the benefit of priority of Japanese application no. 2019-153505, filed on Aug. 26, 2019, which is incorporated herein by reference.

BACKGROUND OF THE INVENTION

Field of the Invention

The present disclosure relates to a non-pneumatic tire.

Description of the Related Art

JP 2015-39986A and JP 2019-43505A describe non-pneumatic tires respectively envisioned as being replacements for pneumatic tires. Each of these comprises a support structure that supports the load from a vehicle, which support structure has an annular outer ring; an annular inner ring provided in concentric fashion toward the interior in the tire radial direction from the outer ring; and a plurality of spokes that connect the outer ring and the inner ring, and that are provided in respectively independent fashion in the tire circumferential direction. Provided toward the exterior in the tire radial direction of outer ring is an annular tread that forms the contact patch.

At a non-pneumatic tire comprising such a support structure, it has been the case that buckling of the tread can occur when under load, with occurrence of a situation in which the tread becomes separated from the road surface at a portion thereof in the tire width direction. When there is occurrence of buckling at the tread, ability of the tire to conform to the road surface is diminished, as a result of which there is a possibility that performance with respect to stability in handling may deteriorate. Employment of a technique such as will make it possible to suppress occurrence of buckling at the tread is therefore desired.

In light of the foregoing state of affairs, it is an object thereof to provide a non-pneumatic tire that will make it possible to suppress occurrence of buckling at the tread.

SUMMARY OF THE INVENTION

At a non-pneumatic tire comprising a support structure as has been described above, it was found that buckling of the tread occurs due to compressive forces that act on the spokes thereof. More specifically, it was learned that when compressive forces act on the spokes, forces in the long direction of the joints between the outer ring and the spokes act on the outer ring in accompaniment thereto and cause deformation of the outer ring and buckling of the tread to occur as a result thereof. A non-pneumatic tire in accordance with the present disclosure was conceived based on such knowledge, and permits achievement of the foregoing object by means of constitutions such as the following.

There is provided a non-pneumatic tire comprises:
an annular outer ring;
an annular inner ring provided in concentric fashion toward the interior in a tire radial direction from the outer ring;
a plurality of spokes that connect the outer ring and the inner ring, and that are provided in respectively independent fashion in a tire circumferential direction; and
an annular tread that is arranged toward the exterior in the tire radial direction from the outer ring and that forms a contact patch;
wherein the plurality of spokes each comprises a joint that is joined to an inner circumferential surface of the outer ring;
a long direction of the joint makes an angle of less than 90° with a tire width direction;
the outer ring comprises a laminate having a plurality of fiber layers, and at least one elastomer layer interposed between an adjacent pair of the plurality of fiber layers;
the plurality of fiber layers include an outermost layer which among the plurality of fibers is that which is arranged in outwardmost fashion in the tire radial direction, and an innermost layer which among the plurality of fibers is that which is arranged in inwardmost fashion in the tire radial direction; and
at least one of the outermost layer and the innermost layer contains a first fiber array at which fibrous material is arrayed so as to extend in the long direction of the joint.

At such a non-pneumatic tire, one of either the outermost layer or innermost layer among a plurality of fiber layers present at a laminate contains a first fiber array at which fibrous material is arrayed so as to extend in the long direction of the joints. This makes it possible to increase the strength of the outer ring in the long direction of the joints and to suppress occurrence of buckling at the tread. At the plurality of fiber layers, the outermost layer is that which is nearest to the tread, and the innermost layer is that which is nearest to the spokes. This being the case, a constitution in which first fiber array(s) are included at one or both of these will be effective in terms of ability to suppress occurrence of buckling at the tread.

Further, the non-pneumatic tire may have a configuration in which:
wherein the at least one of the outermost layer and the innermost layer further comprises, in addition to the first fiber array, a second fiber array at which fibrous material is arrayed so as to extend in the tire circumferential direction.

Because this will make it possible to increase rigidity in the circumferential direction of the outer ring and to ensure ability to withstand load, it will be advantageous in terms of ability to suppress occurrence of buckling at the tread.

Further, the non-pneumatic tire may have a configuration in which:
wherein the first fiber array is one of two thereof that are respectively provided such that there is one thereof at each the outermost layer and the innermost layer; and
the outermost layer and the innermost layer each further comprises, in addition to one of the two first fiber arrays, a second fiber array at which fibrous material is arrayed so as to extend in the tire circumferential direction.

This will make it possible to increase rigidity in the circumferential direction of the outer ring and to ensure ability to withstand load while more effectively suppressing occurrence of buckling at the tread.

Further, the non-pneumatic tire may have a configuration in which:
wherein the plurality of fiber layers has a central layer arranged between the outermost layer and the innermost layer; and
the central layer comprises a second fiber array at which fibrous material is arrayed so as to extend in the tire circumferential direction.

This will make it possible to increase rigidity in the circumferential direction of the outer ring and to ensure ability to withstand load.

Further, the non-pneumatic tire may have a configuration in which:

wherein the joint is one of plurality thereof that include a first joint arranged at a first side in the tire width direction, and a second joint arranged at a second side in the tire width direction; and the first joint and the second joint are arranged in alternating fashion along the tire circumferential direction.

Because this is a spoke structure for which buckling at the tread is especially likely to occur, adoption of such constitution will be all the more useful.

Further, the non-pneumatic tire may have a configuration in which:

wherein a way in which a long direction of the first joint is inclined with respect to the tire width direction is identical to a way in which a long direction of the second joint is inclined with respect to the tire width direction; and the fibrous material of the first fiber array extends in the long direction of the first and second joints.

This will make it possible to suppress occurrence of buckling at the tread.

Further, the non-pneumatic tire may have a configuration in which:

wherein a long direction of the first joint and a long direction of the second joint are parallel to the tire width direction; and the fibrous material of the first fiber array extends in parallel fashion with respect to the tire width direction.

Further, the non-pneumatic tire may have a configuration in which:

wherein a way in which a long direction of the first joint is inclined with respect to the tire width direction is opposite a way in which a long direction of the second joint is inclined with respect to the tire width direction; and the first fiber array has a first-side fiber array at which fibrous material is arrayed so as to extend in the long direction of the first joint, and a second-side fiber array at which fibrous material is arrayed so as to extend in the long direction of the second joint.

In such case, while the long directions of the joints are directed in opposite fashion at the first versus second sides in the tire width direction, due to the fact that the first fiber array has a first-side fiber array and a second-side fiber array as described above, this makes it possible to suppress occurrence of buckling at the tread.

Further, the non-pneumatic tire may have a configuration in which:

wherein the plurality of spokes include a first spoke that extends so as to be directed toward the second side in the tire width direction of the inner ring from the first side in the tire width direction of the outer ring, and a second spoke that extends so as to be directed toward the first side in the tire width direction of the inner ring from the second side in the tire width direction of the outer ring.

In such case, because this is a spoke structure for which buckling at the tread is especially likely to occur, adoption of such constitution will be all the more useful.

Further, the non-pneumatic tire may have a configuration in which:

wherein a diametric dimension of the fibrous material at the second fiber array is greater than a diametric dimension of the fibrous material at the first fiber array.

Further, the non-pneumatic tire may have a configuration in which:

the number of ends of the fibrous material is measured per unit area in a plane perpendicular to a length direction of the fibrous material.

DETAILED DESCRIPTION OF THE INVENTION

Figure 1:
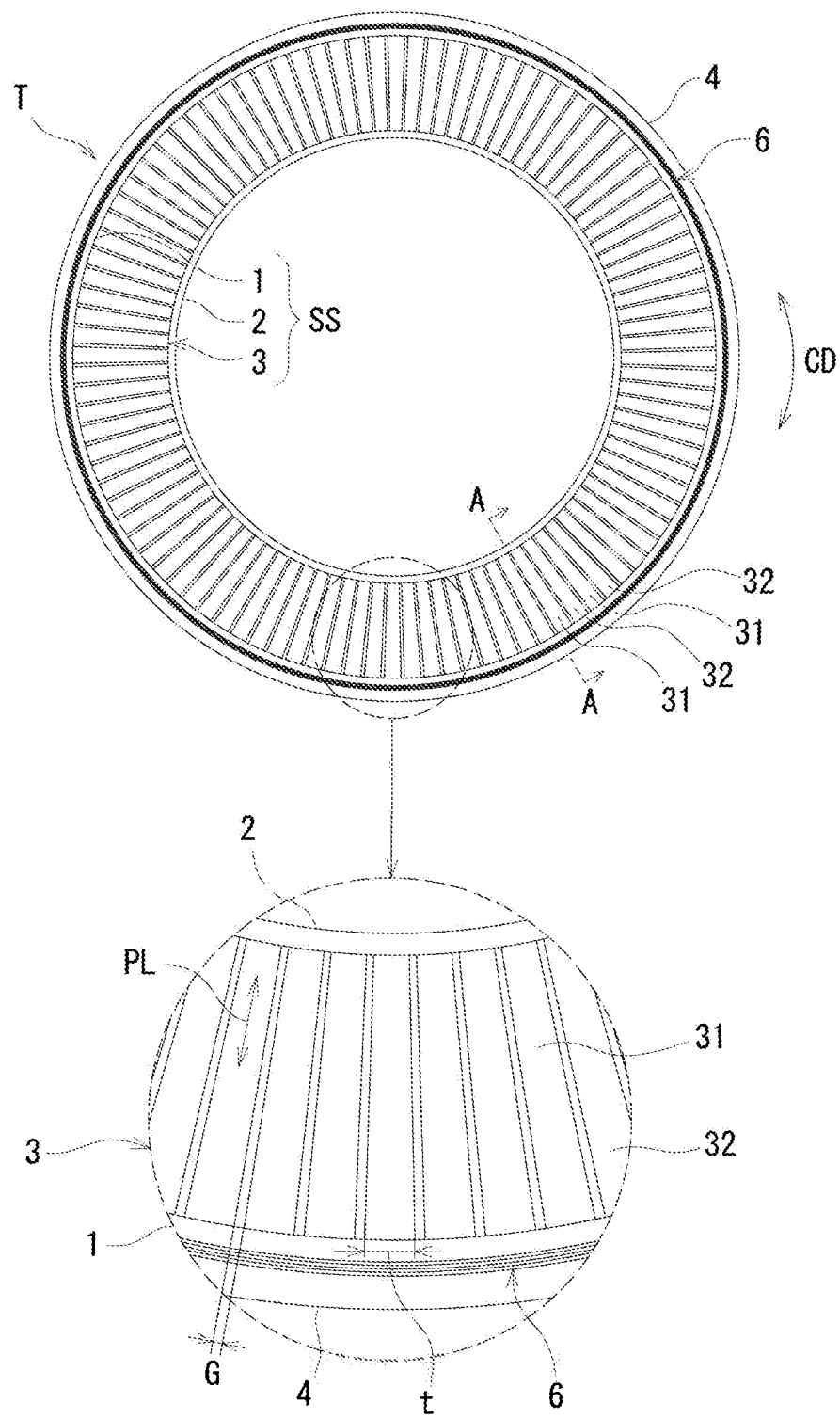
FIG. 1 is a front view showing an example of a non-pneumatic tire associated with an embodiment.
Figure 2:
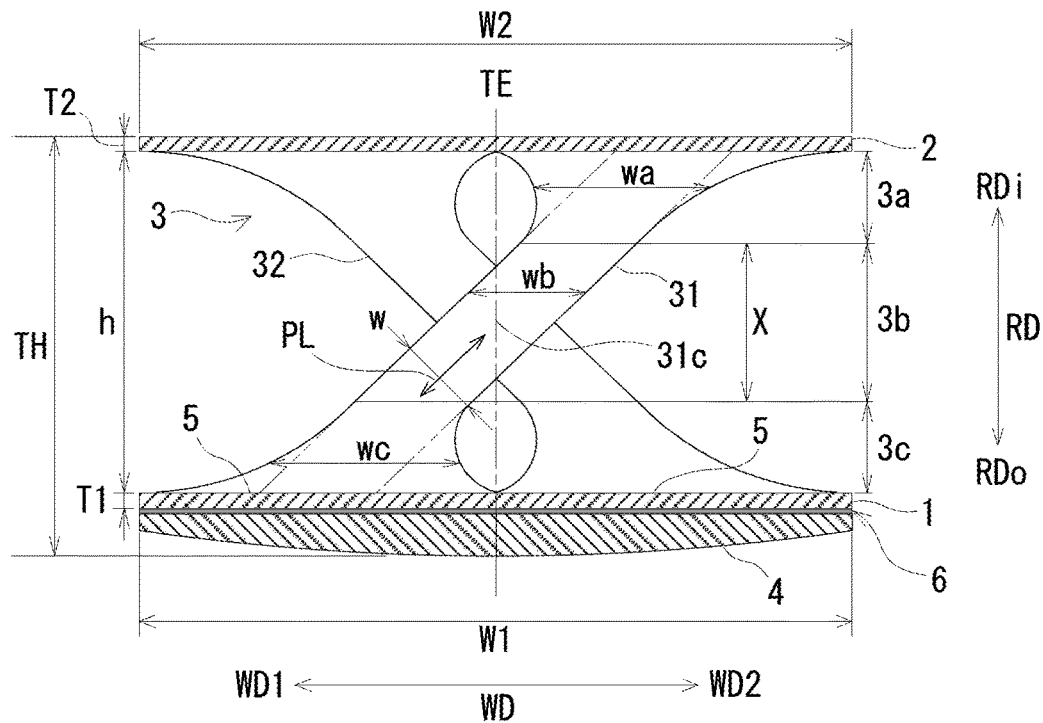
FIG. 2 is a tire meridional section of a non-pneumatic tire.
Figure 3:
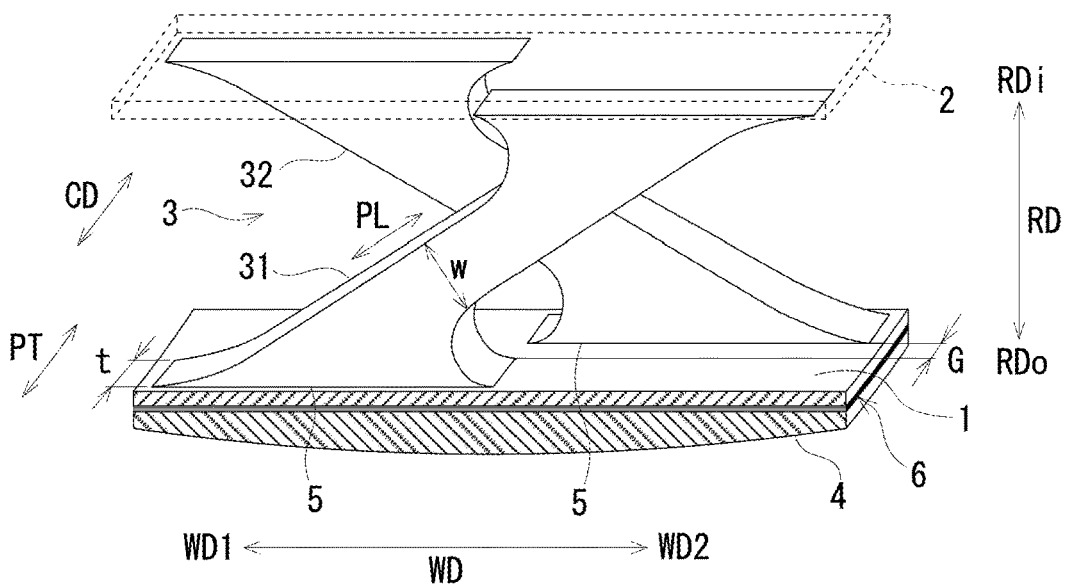
FIG. 3 is a perspective view showing a portion of a non-pneumatic tire.

An embodiment of a non-pneumatic tire will be described with reference to the drawings. FIG. 1 is a front view showing an example of non-pneumatic tire T, a portion thereof being shown in enlarged fashion. FIG. 2 is a tire meridional section of that non-pneumatic tire T, and corresponds to section A-A at FIG. 1. FIG. 3 is a perspective view showing a portion of the non-pneumatic tire shown in FIG. 2.

As shown in FIG. 1, non-pneumatic tire T comprises support structure SS that supports the load from the vehicle. Support structure SS has annular outer ring 1; annular inner ring 2 provided in concentric fashion toward the interior RDi in the tire radial direction from that outer ring 1; and a plurality of spokes 3 that connect outer ring 1 and inner ring 2. The plurality of spokes 3 are provided in respectively independent fashion in the tire circumferential direction CD.

It is preferred that, except for laminate 6 and/or other such reinforcing element(s), described below, outer ring 1, inner ring 2, and spokes 3 be formed from what are basically mutually identical materials. This will make it possible, when manufacturing support structure SS, to, for example, employ cast molding, as a result of which it will be possible to easily cause these to be molded in integral fashion. In accordance with the present embodiment, support structure SS is molded in integral fashion from an elastic material, which is to say that outer ring 1, inner ring 2, and the plurality of spokes 3 are molded in integral fashion.

In the present specification, the term elastic material is used to indicate a material for which the tensile modulus is not greater than 100 MPa as calculated from the tensile stress that exists when elongation is 10% when tensile testing is carried out in accordance with JIS K7312. From the standpoint of imparting support structure SS with adequate endurance and suitable rigidity, it is preferred that the tensile modulus of the elastic material be 5 MPa to 100 Mpa, and more preferred that this be 7 MPa to 50 Mpa. As elastic materials that may be used as base material, thermoplastic elastomers, crosslinked rubbers, and other such resins may be cited as examples.

As thermoplastic elastomer, polyester elastomer, polyolefin elastomer, polyamide elastomer, polystyrene elastomer, polyvinyl chloride elastomer, and polyurethane elastomer may, for example, be employed. As rubber material making up crosslinked rubber, besides natural rubber, styrene-butadiene rubber (SBR), butadiene rubber (BR), isoprene rubber (IIR), nitrile rubber (NBR), hydrogenated nitrile rubber (hydrogenated NBR), chloroprene rubber (CR), ethylene-propylene rubber (EPDM), fluorinated rubber, silicon rubber, acrylic rubber, urethane rubber, and/or other such synthetic rubber may, for example, be employed. Two or more of such rubber materials may where necessary be employed in combination.

As other resin, thermoplastic resin(s) and/or thermosetting resin(s) may be employed. As thermoplastic resin, polyethylene resin, polystyrene resin, polyvinyl chloride resin, and/or the like may, for example, be employed. As thermosetting resin, epoxy resin, phenolic resin, polyurethane resin, silicon resin, polyimide resin, melamine resin, and/or the like may, for example, be employed. From the standpoints of moldability and workability, among the aforementioned elastic materials, polyurethane resin is preferably used. Moreover, foamed materials may be used as elastic materials, it being possible to use the foregoing thermoplastic elastomers, crosslinked rubbers, and other such resins when these have been foamed.

Outer ring 1 is formed as a cylindrical body constituting an annulus congruent to the tire circumferential direction CD. It is preferred from the standpoint of improving the uniformity of tire T that thickness T1 of outer ring 1 be constant. From the standpoint of achieving improvement in weight reduction and endurance while permitting adequate transmission of force from spokes 3, it is preferred that thickness T1 be 2% to 20% of tire cross-sectional height TH, and more preferred that this be 10% to 15% thereof. Where this is contemplated for use as a replacement for an ordinary automobile pneumatic tire, it is preferred that the inside diameter of outer ring 1 be 420 mm to 750 mm, and more preferred that this be 470 mm to 680 mm. In like fashion, where this is contemplated for use as a replacement for an automobile tire, it is preferred that width W1 of outer ring 1 in the tire width direction WD be 100 mm to 300 mm, and more preferred that this be 120 mm to 250 mm.

Provided at the exterior RDo in the tire radial direction of outer ring 1 is annular tread 4 that forms the contact patch. While tread 4 is formed from rubber, it is also possible for this to be formed from resin. Where tread 4 is formed from rubber, a rubber composition similar to that at the tread rubber provided at a conventional pneumatic tire is preferably employed thereat. Where tread 4 is formed from resin, the same resin as is employed in the material making up support structure SS is preferably employed thereat. To increase driveability on wet road surfaces, various tread patterns may be provided at the outer circumferential surface of tread 4.

Inner ring 2 is formed as a cylindrical body constituting an annulus congruent to the tire circumferential direction CD. It is preferred from the standpoint of improving the uniformity of tire T that thickness T2 of inner ring 2 be constant. From the standpoint of achieving improvement in weight reduction and endurance while permitting adequate transmission of force from spokes 3, it is preferred that thickness T2 be 2% to 10% of tire cross-sectional height TH, and more preferred that this be 3% to 9% thereof. Where this is contemplated for use as a replacement for an ordinary automobile pneumatic tire, it is preferred that the inside diameter of inner ring 2 be 250 mm to 500 mm, and more preferred that this be 320 mm to 440 mm. In like fashion, where this is contemplated for use as a replacement for an automobile tire, it is preferred that width W2 of inner ring 2 in the tire width direction WD be 100 mm to 300 mm, and more preferred that this be 120 mm to 250 mm.

Members (not shown) for accommodation of the wheel hubs and/or rim may be provided toward the interior RDi in the tire radial direction of inner ring 2. Nonflat features for maintaining engagement with such accommodation members may be provided at the inner circumferential surface of inner ring 2.

The plurality of spokes 3 respectively extend in the tire radial direction RD and connect outer ring 1 and inner ring 2. The respective ends toward the exterior in the tire radial direction of spokes 3 are joined to the inner circumferential surface of outer ring 1, and the respective ends toward the interior in the tire radial direction of spokes 3 are joined to the outer circumferential surface of inner ring 2. It is preferred from the standpoint of improving the uniformity of tire T that gap G between spokes 3 in the tire circumferential direction CD be constant. It is preferred from the standpoint of achieving uniformity in contact patch pressure as well as of suppressing increase in noise that gap G be not greater than 10 mm, and more preferred that this be not greater than 5 mm.

Shown by way of example at the present embodiment is a situation in which the plurality of spokes 3 include first spokes 31 that extend so as to be directed toward second side WD2 in the tire width direction of inner ring 2 (hereinafter sometimes referred to simply as "second side WD2") from first side WD1 in the tire width direction of outer ring 1 (hereinafter sometimes referred to simply as "first side WD1"), and second spokes 32 that extend so as to be directed toward first side WD1 of inner ring 2 from second side WD2 of outer ring 1. Mutually adjacent first spoke 31 and second spoke 32 are arranged in what appears to be X-shaped fashion as viewed in the tire circumferential direction CD. The plurality of spokes 3 are made up of first spokes 31 and second spokes 32 which are arrayed in alternating fashion as one proceeds along the tire circumferential direction CD.

From the standpoint of improving weight reduction and transmission of motive force, and of achieving improvement in endurance, while permitting adequate support of the load from the vehicle, it is preferred that there be 50 to 300 of spokes 3, and it is more preferred that there be 100 to 200 thereof. In accordance with the present embodiment, the plurality of spokes 3 are made up of 50 first spokes 31 and 50 second spokes 32 (see FIG. 1). From the standpoint of achieving improvement in weight reduction and endurance as well as improvement in lateral rigidity while permitting adequate transmission of force from outer ring 1 and inner ring 2, it is preferred that the tensile modulus of spokes 3 be 5 MPa to 180,000 MPa, and it is more preferred that this be 7 MPa to 50,000 MPa. Fiber-reinforced material(s) in which elastic material(s) are reinforced with fibers may be employed to increase the tensile modulus of spokes 3.

First spoke 31 is formed in the shape of a long plate that extends in the tire radial direction RD and in the tire width direction WD. First spoke 31 has plate thickness t in the tire circumferential direction CD, and has plate width w which is greater than plate thickness t. While plate thickness t may be constant in length direction PL, it is preferred as shown in FIG. 1 that it gradually increase as one proceeds toward the exterior RDo in the tire radial direction. Even where this is the case, plate thickness t is less than plate width w at joint 5 between the respective ends toward the exterior in the tire radial direction of spokes 3 and the inner circumferential surface of outer ring 1. At the present embodiment, plate thickness direction PT is identical to the tire circumferential direction CD.

From the standpoint of achieving improvement in weight reduction and endurance while permitting adequate transmission of force from outer ring 1 and inner ring 2, it is preferred that plate thickness t be 8 mm to 30 mm, and it is more preferred that this be 10 mm to 25 mm. From the same standpoint, it is preferred that plate width w be 5 mm to 25 mm, and more preferred that this be 10 mm to 20 mm. Furthermore, from the standpoint of reducing distribution of contact patch pressure while permitting improvement in endurance, it is preferred that plate width w be not less than 110% of plate thickness t, and more preferred that this be not less than 115% thereof. Apart from the fact that they are arranged so as to be symmetric about tire equatorial plane TE with respect to first spokes 31, because second spokes 32 are otherwise formed in similar fashion as first spokes 31, description that would be redundant is omitted.

First spoke 31 consists of inner end portion 3a, central portion 3b, and outer end portion 3c. Central portion 3b includes zone X which is centered on center 31c of the height of first spoke 31 in the tire radial direction RD, this zone X being 30% to 70% of height h of first spoke 31. Whereas plate width wb of central portion 3b in the tire width direction WD is constant, plate width wc of outer end portion 3c gradually increases as one proceeds toward the exterior RDo in the tire radial direction. This makes it possible to reduce concentration of stress at joint 5 and to improve endurance. In like fashion, plate width wa of inner end portion 3a gradually increases as one proceeds toward the interior RDi in the tire radial direction.

Figure 4:
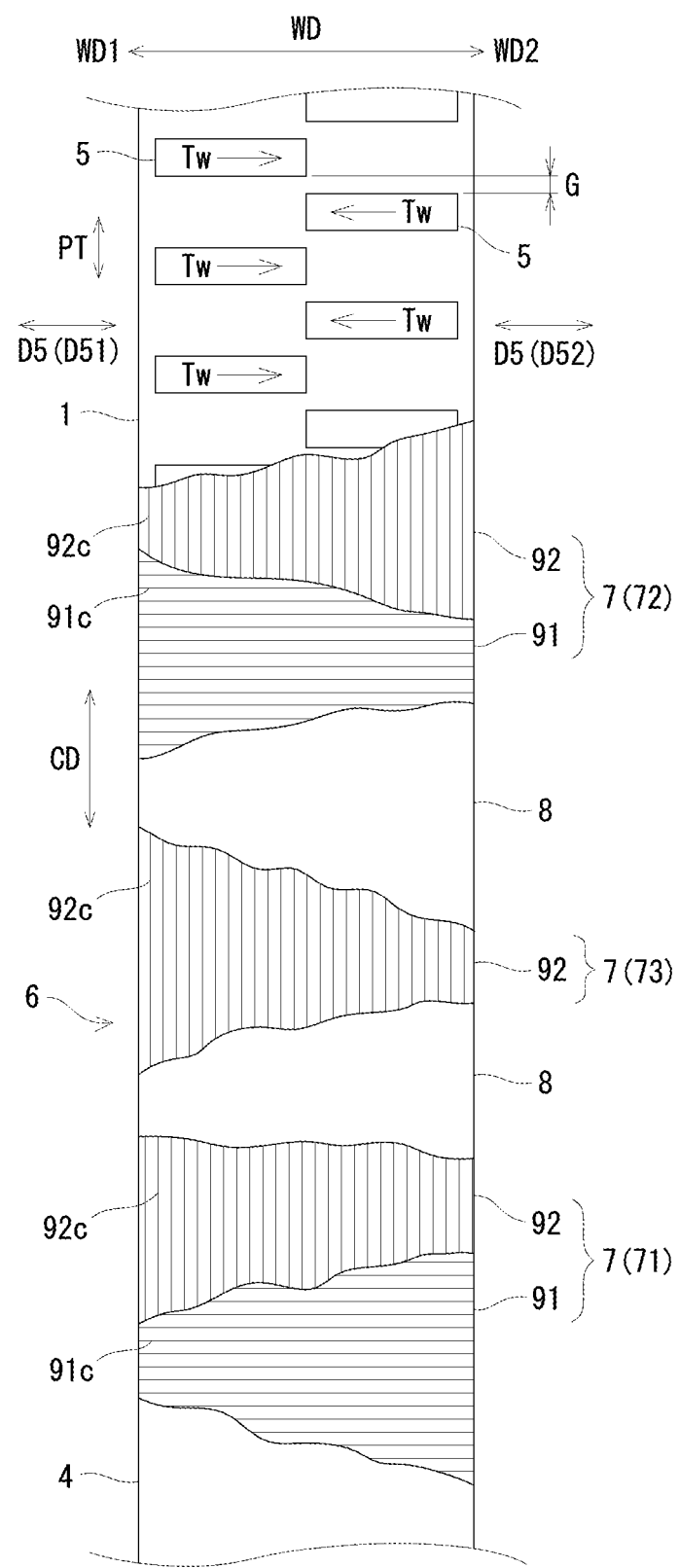
FIG. 4 is a drawing showing the inner circumferential surface of an outer ring as it would exist if unwrapped so as to lie in a single plane.

FIG. 4 is a drawing showing the inner circumferential surface of outer ring 1 as it would exist if unwrapped so as to lie in a single plane. At the present embodiment, joints 5 are arranged in zigzagging fashion along the tire circumferential direction CD so as to mutually alternate between first side WD1 and second side WD2 in the tire width direction WD. Joint 5 has a rectangular locus, the long direction D5 of this joint 5 being perpendicular to plate thickness direction PT. Spoke 3 is provided in such fashion as to cause long direction D5 of joint 5 to make an angle of less than 90° with the tire width direction WD. It is preferred that the angle that long direction D5 makes with the tire width direction WD be not greater than 89°, and more preferred that this be not greater than 60°. At the present embodiment, the angle that long direction D5 makes with the tire width direction WD is 0°, long direction D5 being identical to the tire width direction WD.

Figure 5:
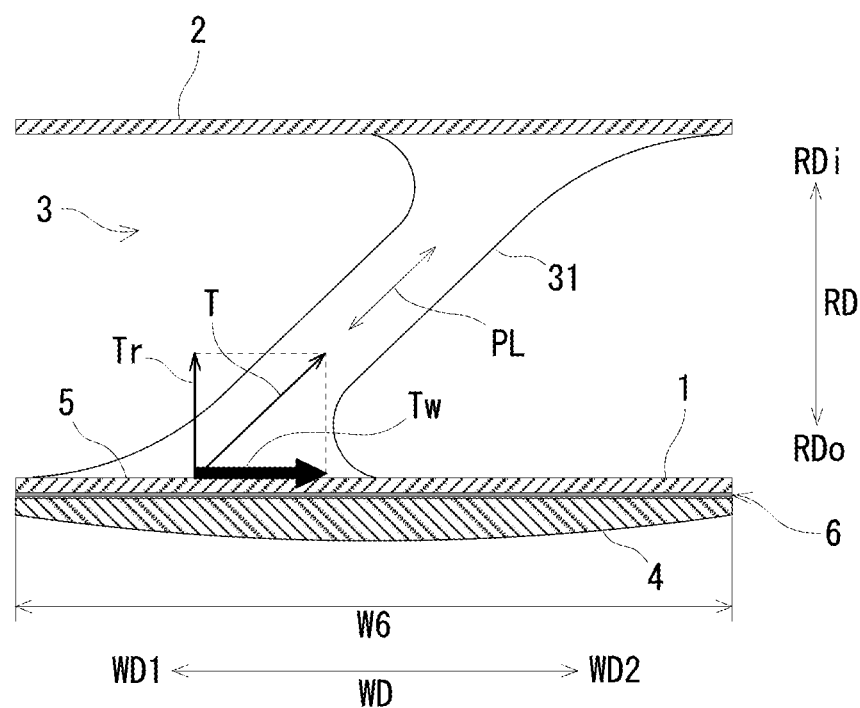
FIG. 5 is a drawing for describing the forces that act on spokes when under load.

When a load is applied to tire T, compressive forces in the tire radial direction RD act on support structure SS, producing tension T in length direction PL at spokes 31 as shown at FIG. 5. This tension T is the resultant of component Tr in the tire radial direction RD, and component Tw, Tw', Tw" in the tire width direction WD. Component Tw, Tw', Tw" acts on outer ring 1 in long direction D5, D5', D5" of joint 5, 5', 5" respectively so as to be directed toward second side WD2 at the end toward the exterior in the tire radial direction of spoke 31, and so as to be directed toward first side WD1 at the end toward the exterior in the tire radial direction of spoke 32. If due to action of such force (component Tw, Tw', Tw"), outer ring 1 should deform, causing occurrence of buckling of tread 4, tread 4 would become separated from the road surface at a portion thereof in the tire width direction WD, causing deterioration in performance with respect to stability in handling.

At non-pneumatic tire T in accordance with the present embodiment, by therefore causing laminate 6, described below, to be provided at outer ring 1, it is possible to increase the strength of outer ring 1 in long direction D5 of joint 5, and suppress occurrence of buckling at tread 4. Whereas in the present embodiment spokes 3 are arranged in X-shaped fashion so as to extend in the tire radial direction RD and the tire width direction WD, note that neither the shape nor the arrangement of the spokes that may be provided at the non-pneumatic tire is limited hereto. For example, the structure might be such that the plurality of spokes are made to simply extend in the tire radial direction RD, in which case it may also be that when a load is applied thereto a force will act thereon that tends to cause deformation of outer ring 1, as a result of which there will be a possibility that buckling may occur.

As shown in FIGS. 1 through 4, provided at outer ring 1 is laminate 6 for reinforcing that outer ring 1. Laminate 6 is formed after the fashion of an annulus which is congruent to the tire circumferential direction CD. It is preferred from the standpoint of ensuring reinforcing effect that width W6 (see FIG. 5) of laminate 6 be not less than 10% of width W1 of outer ring 1, and more preferred that this be not less than 50% thereof. In accordance with the present embodiment, laminate 6 is provided at the outside circumference of outer ring 1, and tread 4 is provided at the outside circumference of that laminate 6. Note, however, that there is no limitation with respect thereto, it being possible, for example, to employ a structure in which laminate 6 is embedded within the interior of outer ring 1.

As shown in FIG. 4, laminate 6 has a plurality of fiber layers 7, and elastomer layer(s) 8 interposed between/among that plurality of fiber layers 7. That is, fiber layers 7 and elastomer layer(s) 8 are laminated in the tire radial direction RD. In accordance with the present embodiment, each of the plurality of fiber layers 7 consists of three layers, these being outermost layer 71, innermost layer 72, and central layer 73 which is arranged between that outermost layer 71 and that innermost layer 72. Central layer 73 need not be present, the plurality of fiber layers 7 being made up of at least two layers that include outermost layer 71 which among that plurality of fiber layers 7 is arranged outwardmost RDo in the tire radial direction, and innermost layer 72 which is likewise arranged inwardmost RDi in the tire radial direction thereamong.

At this non-pneumatic tire T, outermost layer 71 and innermost layer 72 each comprise a first fiber array 91. Because arrayed at first fiber array 91 there is fibrous material 91c which extends in long direction D5 of joint 5, this increases the strength of outer ring 1 in that long direction D5. Because outermost layer 71 is that which among the plurality of fiber layers 7 is nearest to tread 4, and innermost layer 72 is that which thereamong is nearest to spokes 3, inclusion of first fiber arrays 91 thereat makes it possible to effectively suppress occurrence of buckling at tread 4. While it sufficient that one of either outermost layer 71 or innermost layer 72 comprise a first fiber array 91, where as in the present embodiment each of these comprises a first fiber array 91 this will make it possible to increase the benefit in terms of the improvement achieved thereby.

From the standpoint of appropriately increasing strength of outer ring 1 in long direction D5, it is preferred that the angle that fibrous material 91c which makes up first fiber array 91 makes with long direction D5 be not greater than 10°, more preferred that this be not greater than 6°, and most preferred that this be substantially 0°, i.e., parallel with respect thereto. First fiber array 91 is made up of fibrous material that is topped with rubber and/or resin. There being no particular limitation with respect to the fibrous material, rayon cord(s), nylon cord(s), polyester cord(s), aramid cord (s), and/or other such organic fiber(s) and/or steel cord(s) and/or other such metal fiber(s) may, for example, be favorably employed thereat, this being true with respect to second fiber array 92, described below, as well.

In accordance with the present embodiment, outermost layer 71 and innermost layer 72 each comprise, in addition to first fiber array 91, second fiber array 92 at which fibrous material 92c is arrayed so as to extend in the tire circumferential direction CD. There being no limitation that these be comprised by each of outermost layer 71 and innermost layer 72, it is sufficient that one of either thereof comprise a second fiber array 92. It is preferred that first fiber array 91 be laminated at the outside circumference of second fiber array 92, as doing so will make it possible for first fiber array 91 to be arranged near tread 4, which will permit improvement in the reinforcing effect of first fiber array 91. Second fiber array 92 might, for example, be formed by causing fibrous material in the form of one or a plurality of fibers topped with rubber and/or resin to be wound in helical fashion in the tire circumferential direction.

Central layer 73 comprises second fiber array 92 at which fibrous material 92c is arrayed so as to extend in the tire circumferential direction CD. While central layer 73 may comprise first fiber array 91 and/or other such fiber array(s), it is preferred from the standpoint of achieving reduction in weight that it comprise only second fiber array 92 as is the case in the present embodiment. Furthermore, to increase the ability of non-pneumatic tire T to withstand load, it is also possible for central layer 73 to be made up of two or more layers of second fiber arrays 92.

Whereas in the present embodiment elastomer layers 8 were formed from rubber, there is no limitation with respect thereto, it being possible, for example, for these to be formed from resin. While it is preferred that the material making up elastomer layers 8 be the same as the material with which the aforementioned fibrous material is topped, there is no objection to employment of a different material thereat. Thickness of elastomer layer 8 might, for example, be 0.1 mm to 20 mm.

At respective fiber layers 7, there is no objection to combined use of fiber arrays of differing materials. For example, at outermost layer 71 and/or innermost layer 72, first fiber array 91 might be made up of organic fiber(s), and second fiber array 92 might be made up of steel cord(s). Note, however, that based upon consideration of ease of manufacturing it is preferred that these comprise only fiber arrays that are made of the same material. Furthermore, at respective fiber layers 7, there may be combined use of fiber arrays employing fibrous material(s) of differing numbers of ends and/or differing diametric dimensions. For example, to increase rigidity in the circumferential direction at outer ring 1, the numbers of ends and/or the diametric dimension of fibrous material 92c at second fiber array 92 comprised by outermost layer 71 and/or innermost layer 72 may be made larger than same at first fiber array 91. Numbers of ends refers to the number of fibers pressed thereinto per prescribed region, this being measured in a plane perpendicular to the length direction of the fibers.

There is no objection to combined use of fiber arrays made of materials that differ depending on whether it is outermost layer 71 or innermost layer 72 at which they are present. For example, fiber array(s) comprised by outermost layer 71 might be made up of steel cord(s), and fiber array(s) comprised by innermost layer 72 might be made up of organic fiber(s). Where this is the case, it will be possible to improve resistance to damage from the exterior by increasing the strength of outermost layer 71 which is relatively near to tread 4. Furthermore, while achieving improved strength due to fiber array(s) that are made up of steel cord(s), it will at the same time be possible to obtain the benefit of reduction in weight due to use of fiber array(s) that are made up of organic fiber(s).

Long direction D5 (hereinafter "long direction D51") of joint 5 arranged at first side WD1 and long direction D5 (hereinafter "long direction D52") of joint 5 arranged at second side WD2 are in mutually identical directions, this mutually identical direction being the direction in which fibrous material 91c of first fiber array 91 extends. Whereas in accordance with the present embodiment long direction D51 and long direction D52 are respectively identical to the tire width direction WD, there is no limitation with respect thereto. For example, as shown in FIG. 6, it is also possible to adopt a constitution in which long direction D51' and long direction D52' of joint 5' are in mutually identical directions which are respectively inclined with respect to the tire width direction WD, fibrous material 91c' of first fiber array 91' of the outermost layer 71' and the innermost layer 72' of the fiber layers 7' extending in those mutually identical directions.

Figure 7:
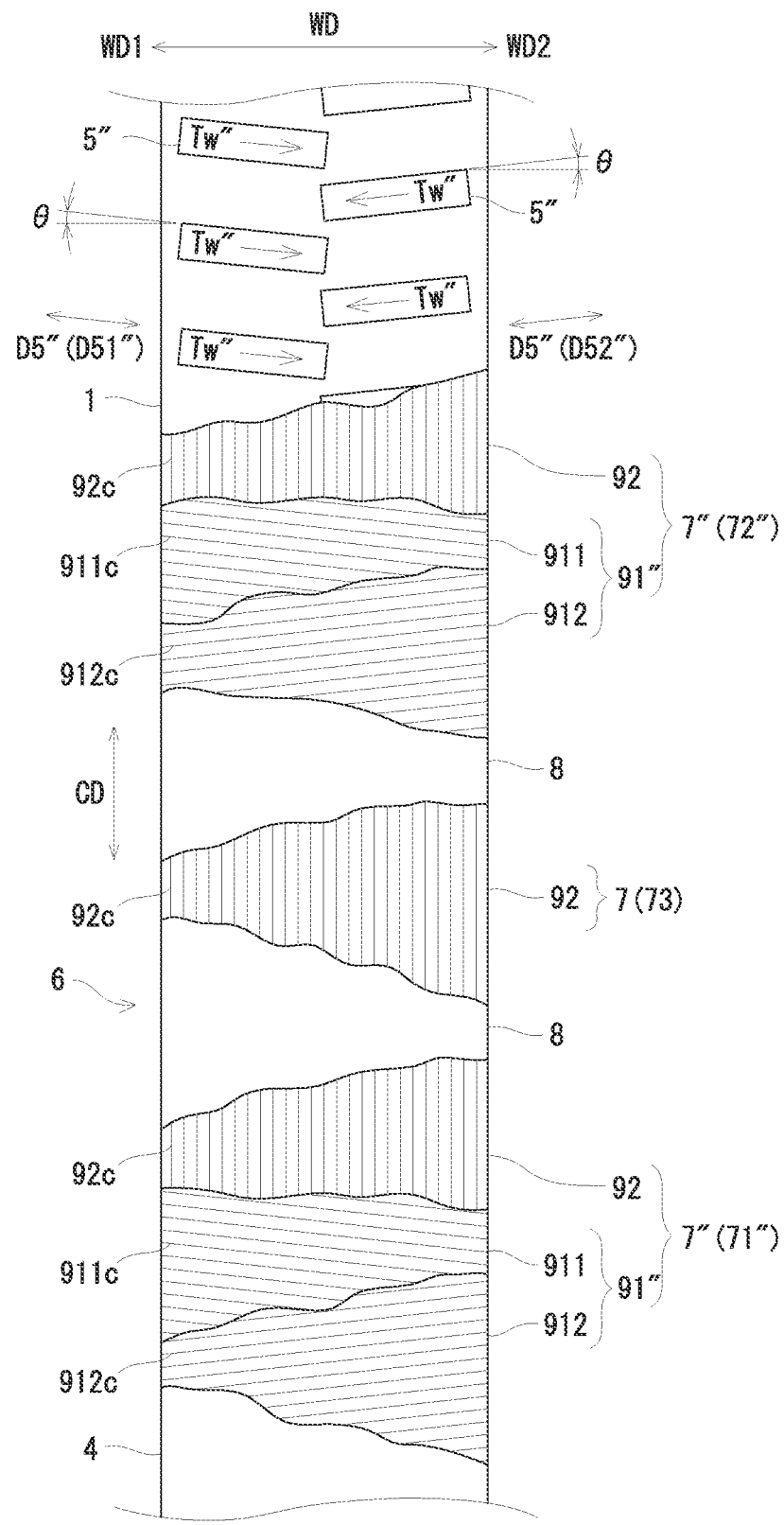
FIG. 7 is a drawing showing the inner circumferential surface of an outer ring as it would exist if unwrapped so as to lie in a single plane at a non-pneumatic tire in accordance with another embodiment.
Figure 8:
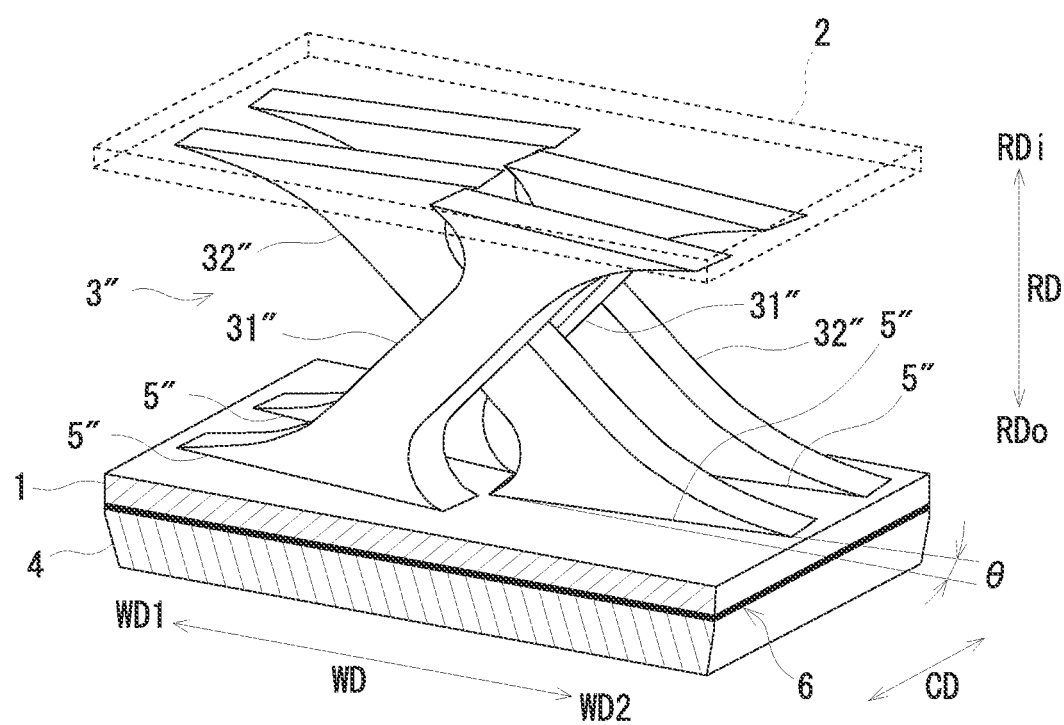
FIG. 8 is a perspective view showing a portion of a non-pneumatic tire in accordance with another embodiment.

As shown in FIG. 7, long direction D51" and long direction D52" may be inclined in mutually opposite fashion with respect to the tire width direction WD. In such case, first fiber array 91" of the outermost layer 71" and the innermost layer 72" of the fiber layers 7" has first-side fiber array 911 at which fibrous material 911c is arranged so as to extend in long direction D51", and second-side fiber array 912 at which fibrous material 912c is arranged so as to extend in long direction D52". First-side fiber array 911 and second-side fiber array 912 are laminated in such fashion that the respective fibers thereof intersect in mutually oppositely inclined fashion at a location therebetween. Even in the context of a constitution in which long direction D51" and long direction D52" of the joint 5" are inclined in mutually opposite fashion, it will still be possible as shown in FIG. 8 to cause spokes 3" to be provided such that first spokes 31" and second spokes 32" are arranged in X-shaped fashion.

Figure 6:
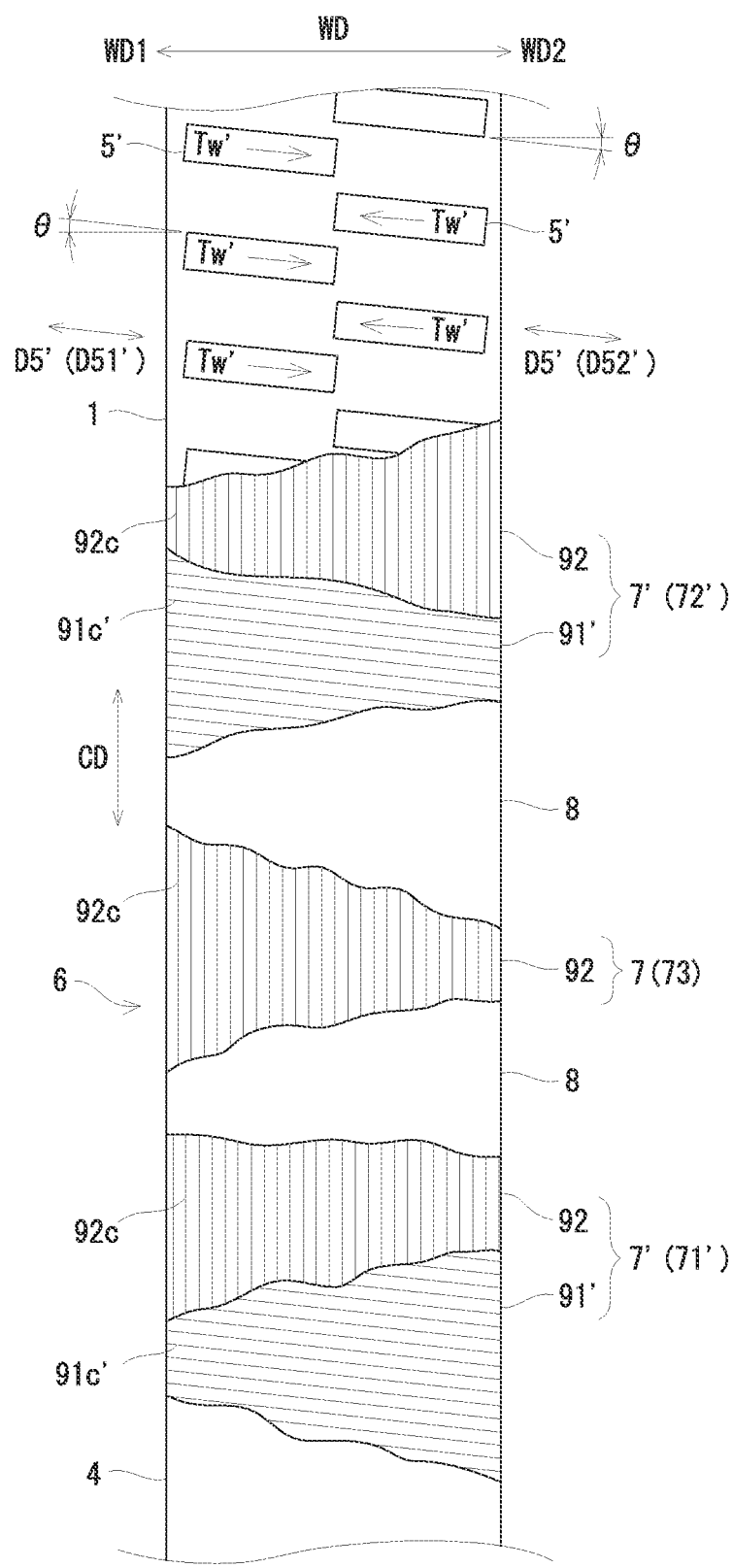
FIG. 6 is a drawing showing the inner circumferential surface of an outer ring as it would exist if unwrapped so as to lie in a single plane at a non-pneumatic tire in accordance with another embodiment.

At the variations shown in FIG. 6 and FIG. 7, the angle of inclination θ of joint 5' and 5" with respect to the tire width direction WD might, for example, be 0.1° to 89°. There is no objection to a situation in which the angle of inclination θ is different at first side WD1 versus second side WD2. It is preferred that the angle that fibrous material 911c which makes up first-side fiber array 911 makes with long direction D51", and the angle that fibrous material 912c which makes up second-side fiber array 912 makes with long direction D52" respectively be not greater than 10°, more preferred that these be not greater than 6°, and most preferred that these be substantially 0°, i.e., parallel with respect thereto. Except for the constitution described above, the embodiments shown in FIGS. 6 and 7 may in other respects be constituted in similar as at the embodiment shown in FIGS. 1 through 5.

The present invention should not be understood to be limited in any way by the foregoing embodiments, it being possible to carry out various modifications without departing from the gist of the present invention.

The invention claimed is:

1. A non-pneumatic tire comprising:
an annular outer ring;
an annular inner ring provided in concentric fashion toward the interior in a tire radial direction from the outer ring;
a plurality of spokes that connect the outer ring and the inner ring, and that are provided in respectively independent fashion in a tire circumferential direction; and
an annular tread that is arranged toward the exterior in the tire radial direction from the outer ring and that forms a contact patch, wherein
the plurality of spokes each comprises a joint that is joined to an inner circumferential surface of the outer ring,
a long direction of the joint makes an angle of less than 90° with a tire width direction,
the outer ring comprises a laminate having a plurality of fiber layers, and at least one elastomer layer interposed between an adjacent pair of the plurality of fiber layers,
the plurality of fiber layers include an outermost layer which among the plurality of fibers is that which is arranged in outwardmost fashion in the tire radial direction, and an innermost layer which among the plurality of fibers is that which is arranged in inwardmost fashion in the tire radial direction,
the outermost layer contains a first fiber array at which fibrous material is arrayed so as to extend in the long direction of the joint and a second fiber array at which fibrous material is arrayed so as to extend in the tire circumferential direction, and
the first fiber array and the second fiber array are laminated in the tire radial direction.

2. The non-pneumatic tire according to claim 1, wherein the plurality of fiber layers has a central layer arranged between the outermost layer and the innermost layer, and
the central layer comprises a second fiber array at which fibrous material is arrayed so as to extend in the tire circumferential direction.

3. The non-pneumatic tire according to claim 1, wherein the joint is one of plurality thereof that include a first joint arranged at a first side in the tire width direction, and a second joint arranged at a second side in the tire width direction, and
the first joint and the second joint are arranged in alternating fashion along the tire circumferential direction.

4. The non-pneumatic tire according to claim 3, wherein a way in which a long direction of the first joint is inclined with respect to the tire width direction is identical to a way in which a long direction of the second joint is inclined with respect to the tire width direction, and
the fibrous material of the first fiber array extends in the long direction of the first and second joints.

5. The non-pneumatic tire according to claim 3, wherein a long direction of the first joint and a long direction of the second joint are parallel to the tire width direction, and
the fibrous material of the first fiber array extends in parallel fashion with respect to the tire width direction.

6. The non-pneumatic tire according to claim 3, wherein a way in which a long direction of the first joint is inclined with respect to the tire width direction is opposite a way in which a long direction of the second joint is inclined with respect to the tire width direction, and the first fiber array has a first-side fiber array at which fibrous material is arrayed so as to extend in the long direction of the first joint, and a second-side fiber array at which fibrous material is arrayed so as to extend in the long direction of the second joint.

7. The non-pneumatic tire according to claim 3 wherein the plurality of spokes include a first spoke that extends so as to be directed toward the second side in the tire width direction of the inner ring from the first side in the tire width direction of the outer ring, and a second spoke that extends so as to be directed toward the first side in the tire width direction of the inner ring from the second side in the tire width direction of the outer ring.

8. The non-pneumatic tire according to claim 1 wherein a diametric dimension of the fibrous material at the second fiber array is greater than a diametric dimension of the fibrous material at the first fiber array.

9. The non-pneumatic tire according to claim 1, wherein a number of ends of the fibrous material at the second fiber array is greater than a number of ends of the fibrous material at the first fiber array, and
the number of ends of the fibrous material is measured per unit area in a plane perpendicular to a length direction of the fibrous material.

10. A non-pneumatic tire comprising:
an annular outer ring;
an annular inner ring provided in concentric fashion toward the interior in a tire radial direction from the outer ring;
a plurality of spokes that connect the outer ring and the inner ring, and that are provided in respectively independent fashion in a tire circumferential direction; and
an annular tread that is arranged toward the exterior in the tire radial direction from the outer ring and that forms a contact patch, wherein
the plurality of spokes each comprises a joint that is joined to an inner circumferential surface of the outer ring,
a long direction of the joint makes an angle of less than 90° with a tire width direction,
the outer ring comprises a laminate having a plurality of fiber layers, and at least one elastomer layer interposed between an adjacent pair of the plurality of fiber layers,
the plurality of fiber layers include an outermost layer which among the plurality of fibers is that which is arranged in outwardmost fashion in the tire radial direction, and an innermost layer which among the plurality of fibers is that which is arranged in inwardmost fashion in the tire radial direction,
at least one of the outermost layer and the innermost layer contains a first fiber array at which fibrous material is arrayed so as to extend in the long direction of the joint,
the first fiber array is one of two thereof that are respectively provided such that there is one thereof at each the outermost layer and the innermost layer, and
the outermost layer and the innermost layer each further comprises, in addition to one of the two first fiber arrays, a second fiber array at which fibrous material is arrayed so as to extend in the tire circumferential direction.

11. A non-pneumatic tire comprising:
an annular outer ring;
an annular inner ring provided in concentric fashion toward the interior in a tire radial direction from the outer ring;
a plurality of spokes that connect the outer ring and the inner ring, and that are provided in respectively independent fashion in a tire circumferential direction; and an annular tread that is arranged toward the exterior in the tire radial direction from the outer ring and that forms a contact patch, wherein the plurality of spokes each comprises a joint that is joined to an inner circumferential surface of the outer ring, a long direction of the joint makes an angle of less than 90° with a tire width direction;

the outer ring comprises a laminate having a plurality of fiber layers, and at least one elastomer layer interposed between an adjacent pair of the plurality of fiber layers, the plurality of fiber layers include an outermost layer which among the plurality of fibers is that which is arranged in outwardmost fashion in the tire radial direction, and an innermost layer which among the plurality of fibers is that which is arranged in inwardmost fashion in the tire radial direction, at least one of the outermost layer and the innermost layer contains a first fiber array at which fibrous material is arrayed so as to extend in the long direction of the joint, the joint is one of plurality thereof that include a first joint arranged at a first side in the tire width direction, and a second joint arranged at a second side in the tire width direction, the first joint and the second joint are arranged in alternating fashion along the tire circumferential direction, and a way in which a long direction of the first joint is inclined with respect to the tire width direction is at least one of a) identical to a way in which a long direction of the second joint is inclined with respect to the tire width direction, with the fibrous material of the first fiber array extending in the long direction of the first and second joints, and b) opposite a way in which the long direction of the second joint is inclined with respect to the tire width direction, with the first fiber array having a first-side fiber array at which fibrous material is arrayed so as to extend in the long direction of the first joint and a second-side fiber array at which fibrous material is arrayed so as to extend in the long direction of the second joint.

* * * * *